United States Patent
Hwang (10) Patent No.: US 8,263,243 B2
(45) Date of Patent: Sep. 11, 2012

(54) LITHIUM SECONDARY BATTERY

(75) Inventor: Victor Hwang, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 1129 days.

(21) Appl. No.: 11/491,075

(22) Filed: Jul. 24, 2006

(65) Prior Publication Data

US 2007/0026308 A1 Feb. 1, 2007

(30) Foreign Application Priority Data

Jul. 29, 2005 (KR) ................. 10-2005-0069785

(51) Int. Cl.
H01M 2/00 (2006.01)
H01M 2/04 (2006.01)
H01M 10/50 (2006.01)

(52) U.S. Cl. ........................ 429/62; 429/163; 429/176

(58) Field of Classification Search .......... 429/231.95, 429/62, 163, 176
See application file for complete search history.

(56) References Cited

U.S. PATENT DOCUMENTS

| | | | |
|---|---|---|---|
| 3,464,921 A * | 9/1969 | Erler et al. ................. | 169/47 |
| 2002/0160212 A1* | 10/2002 | Yamashita et al. .......... | 428/458 |
| 2003/0157407 A1* | 8/2003 | Kosuzu et al. ............ | 429/231.95 |
| 2007/0065718 A1* | 3/2007 | Moon ......................... | 429/185 |

FOREIGN PATENT DOCUMENTS

| | | |
|---|---|---|
| JP | 3-203171 A | 9/1991 |
| JP | 5-94837 A | 4/1993 |
| KR | 10-2001-0106452 A | 11/2001 |
| KR | 2004105338 A * | 12/2004 |
| KR | 2006034181 A * | 4/2006 |

OTHER PUBLICATIONS

Machine translation of KR 2006034181 A, Kim et al., Apr. 2006.*
Machine translation of KR 2004105338 A, Hong et al., Dec. 2004.*

* cited by examiner

*Primary Examiner* — Basia Ridley
*Assistant Examiner* — Sean P Cullen
(74) *Attorney, Agent, or Firm* — Knobbe Martens Olson & Bear LLP (57) ABSTRACT

A thermally stabilized Li secondary battery in which at least a portion of the inner surface of a secondary battery case includes an ignition inhibitor so as to prevent an internal temperature of the secondary battery from rising to a predetermined temperature or higher. The Li secondary battery includes: an electrode assembly which includes a first electrode plate, a second electrode plate, and a separator interposed between the first electrode plate and the second electrode plate; a secondary battery case which includes an internal space for accommodating the electrode assembly; and an ignition inhibitor which is formed on at least a portion of the inner surface of the secondary battery case.

9 Claims, 6 Drawing Sheets

LITHIUM SECONDARY BATTERY

CROSS-REFERENCE TO RELATED APPLICATION

This application claims the benefit of Korean Patent Application No. 2005-69785, filed on Jul. 29, 2005, in the Korean Intellectual Property Office, the disclosure of which is incorporated herein by reference.

BACKGROUND OF THE INVENTION

1. Field of the Invention

An aspect of the present invention relates to a lithium (Li) secondary battery, and more particularly, to a thermally stabilized Li secondary battery in which at least a portion of the inner surface of a secondary battery case includes an ignition inhibitor so as to prevent an internal temperature of the secondary battery from rising to a predetermined temperature or higher.

2. Description of the Related Art

Recently, a large number of compact and light-weighted electric or electronic apparatuses such as cellular phones, notebooks, and camcorders have been actively developed and produced. These portable electric or electronic apparatuses are provided with battery packs, so that they can operate without separate power supplies. A battery pack includes at least one battery to output a predetermined voltage so as to drive the portable electric or electronic apparatuses for a predetermined time.

Recently, the battery pack has employed a rechargeable secondary battery for economic benefit. Examples of the secondary battery include: a nickel cadmium (Ni—Cd) battery; a nickel hydride (Ni-MH) battery; and a Li secondary battery such as a Li polymer battery and a Li-ion battery.

Particularly, the Li secondary battery has an operating voltage of 3.6V which is three times higher than that of the Ni—Cd battery or the Ni-MH battery. In addition, the Li secondary battery has a high energy density per unit weight. Therefore, demand for Li secondary batteries has rapidly increased.

In the Li secondary battery, a Li-based oxide is used as a positive electrode active material, and carbon is used as a negative electrode active material. In general, batteries are classified into a liquid electrolyte battery and a polymer electrolyte battery according to a type of the electrolyte. The Li secondary battery using the liquid electrolyte is called a Li-ion battery, and the Li secondary battery using the polymer electrolyte is called a Li polymer battery. Li secondary batteries are manufactured in various shapes. According to the shapes, the Li secondary batteries are classified into a cylindrical battery, a prismatic battery, and a pouch-type battery.

A Li-ion secondary battery includes: an electrode assembly which is formed by rolling a positive electrode plate coated with a positive electrode active material, a negative electrode plate coated with a negative electrode active material, and a separator interposed between the positive and negative electrode plates to prevent an electrical short between the two electrode plates and allow only Li-ion to pass therethrough; a secondary battery case which accommodates the electrode assembly; and an electrolyte solution which is inserted inside the secondary battery case and allows Li-ion to move.

In the Li-ion secondary battery, a positive electrode plate, on which the positive electrode active material is coated and to which a positive electrode tab is connected, a negative electrode plate, on which the negative electrode active material is coated and to which a negative electrode tab is connected, and a separator, are laminated and rolled so as to obtain an electrode assembly.

The electrode assembly is accommodated in the Li-ion secondary battery case and fastened so as not to be detached. Thereafter, the electrolyte solution is injected into the Li-ion secondary battery case, and, an opening portion of the case is sealed with a cap assembly, thereby constituting the Li-ion secondary battery.

However, heat is generated inside the Li secondary battery at charging/discharging times through an electrochemical reaction. In particular, an internal heating value becomes large when abrupt discharging or over-charging occurs, and thus an internal temperature of the battery rapidly increases. As a result, an internal structure changes, thereby generating an electrical short inside the battery. This causes significant danger such as explosion of the Li secondary battery.

SUMMARY OF THE INVENTION

An advantage of some aspects of the invention is to provide a thermally stabilized Li secondary battery in which at least a portion of the inner surface of a secondary battery case includes an ignition inhibitor so as to prevent an internal temperature of the secondary battery from rising to a predetermined temperature or higher.

According to an aspect of the present invention, there is provided a Li secondary battery, the Li secondary battery including an electrode assembly which includes a first electrode plate, a second electrode plate, and a separator interposed between the first electrode plate and the second electrode plate; a secondary battery case which includes an internal space for accommodating the electrode assembly; and an ignition inhibitor which is formed on at least a portion of the inner surface of the secondary battery case.

According to another aspect of the present invention, the ignition inhibitor may include: an ignition inhibiting material layer which is formed on at least a portion of the inner surface of the secondary battery case, and is made of an ignition inhibiting material; and a separation film which separates the ignition inhibiting material from an electrolyte solution.

According to another aspect of the present invention, the separation film may initially melt at a predetermined temperature of 80° C. or higher, so that the ignition inhibiting material can be inserted inside the battery. Further, the separation film may be made of a thermoplastic material or paraffin.

According to another aspect of the present invention, the ignition inhibiting material may be composed of only a material layer that is inserted and diffused inside the battery so as to restrict temperature rising at the predetermined temperature of 80° C. or higher without having to use the separation film.

According to another aspect of the present invention, the ignition inhibiting material layer may be made of NaCl.

According to another aspect of the present invention, the secondary battery case may be a cylindrical metal case having an open upper portion, a box-type metal case having an open upper portion, or a pouch-type case. In the pouch-type case, the ignition inhibiting material layer may be laminated on a metal film surface of the pouch, that is, the inner surface of the pouch, and then a heat sealable resin layer may be laminated thereon.

According to another aspect of the present invention, the Li secondary battery may further include a cap assembly which is bonded with an upper portion of the secondary battery case so as to seal the upper portion of the secondary battery, when the case is a cylindrical metal case or a box-type metal case having an open upper portion.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
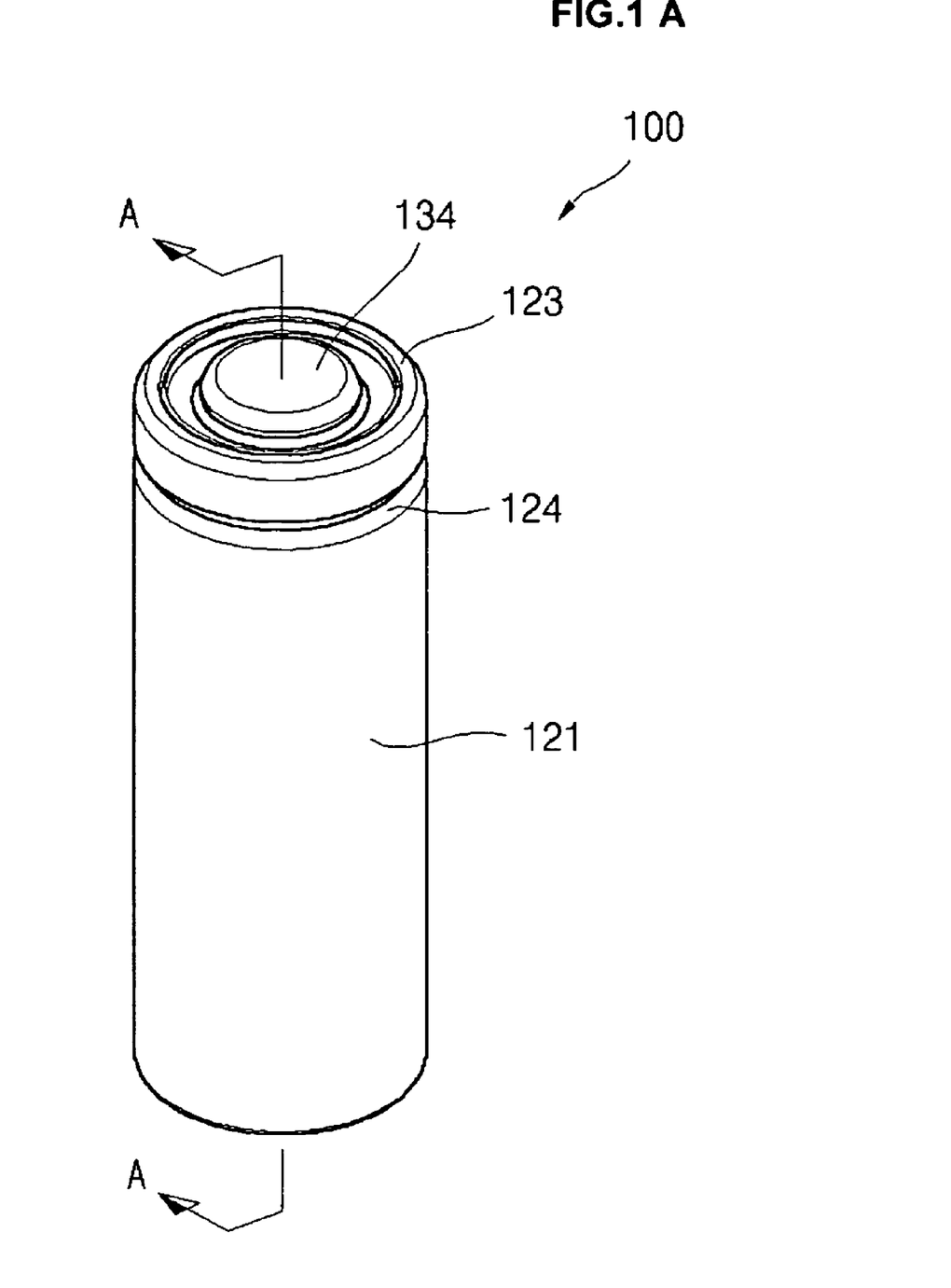
FIG. 1A is a perspective view of cylindrical lithium (Li) secondary battery according to an embodiment of the present invention.
FIG. 1B is a cross-sectional view of the Li secondary battery of FIG. 1A, viewed along the A-A line.
Figure 1B:
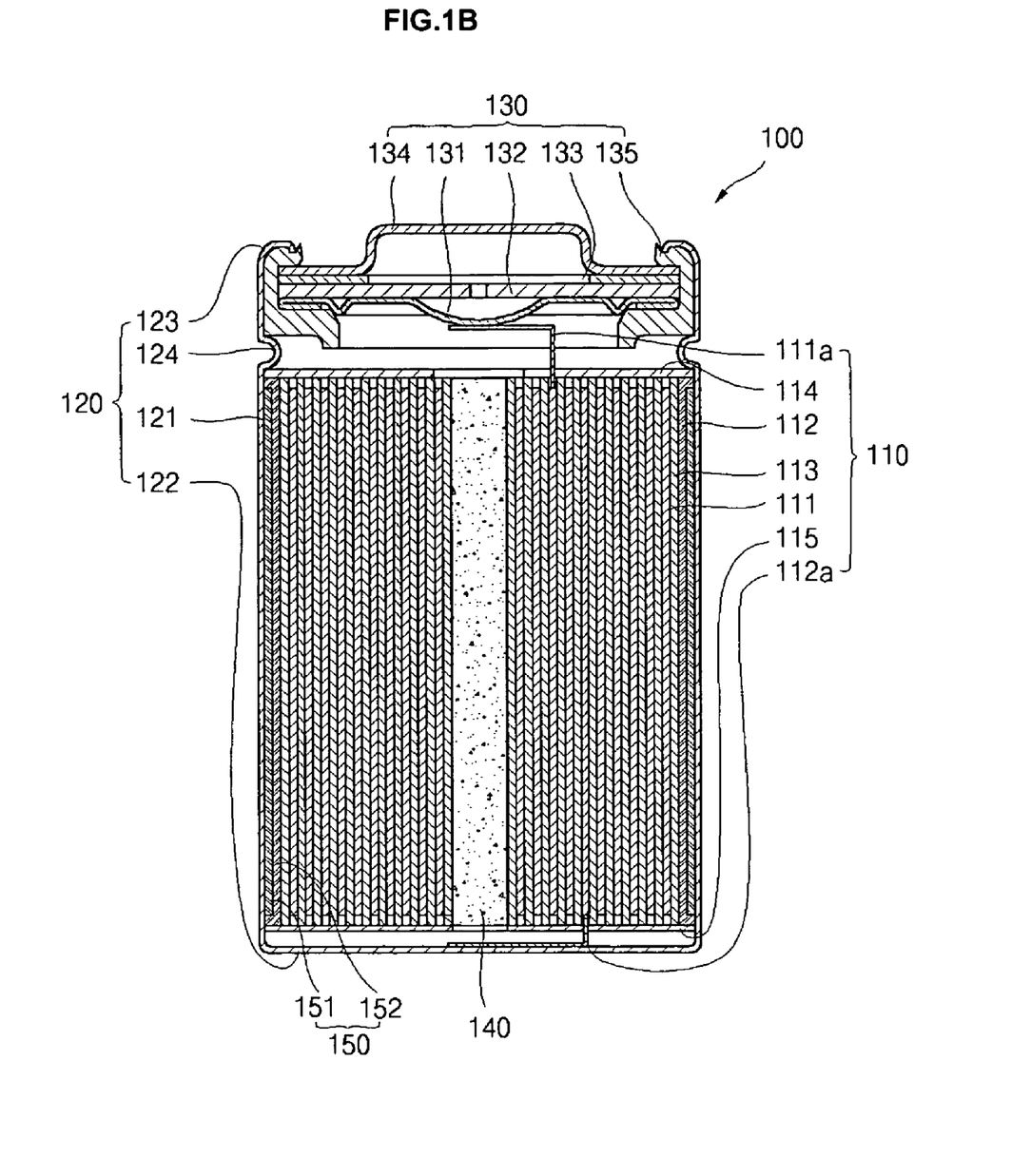

FIG. 1A is a perspective view of cylindrical lithium (Li) secondary battery according to an embodiment of the present invention. FIG. 1B is a cross-sectional view of the Li secondary battery of FIG. 1A, viewed along the A-A line.

Referring to FIGS. 1A and 1B, a cylindrical Li secondary battery 100 includes: an electrode assembly 110 which generates a voltage difference at charging/discharging times; a secondary battery case 120 which accommodates the electrode assembly 110; a cap assembly 130 which is assembled at an upper portion of the secondary battery case 120 and prevents the electrode assembly 110 from separation; an electrolyte solution 140 which is injected into the secondary battery case 120 to allow Li-ion to move in the electrode assembly 110; and an ignition inhibitor 150 which prevents an internal temperature of the cylindrical Li secondary battery 100 from rising due to abnormal heat generation.

The electrode assembly 110 includes: a first electrode plate 111 coated with a positive (or negative) electrode active material, for example, the positive electrode active material; a second electrode plate 112 coated with the negative (or positive) electrode active material, for example, the negative electrode active material; and a separator 113 which is interposed between the first electrode plate 111 and the second electrode plate 112, which prevents the first and second electrode plates 111 and 112 from creating an electrical short, and allows Li-ion alone to move. Further, the first electrode plate 111, the second electrode plate 112, and the separator 113 are rolled in a substantially circular shape, and are accommodated in the secondary battery case 120. The first electrode plate 111 is generally made of aluminum (Al), and is bonded with a first electrode tab 111a protruding upwards a specific length. The second electrode plate 112 is generally made of nickel (Ni), and is bonded with a second electrode tab 112a protruding downwards a specific length. However, an aspect of the present invention is not limited thereto. Moreover, upper and lower insulating plates 114 and 115 are further included at upper and lower portions of the electrode assembly 110, respectively, in order to avoid a direct contact with the cap assembly 130 or the secondary battery case 120.

A chalcogenide chemical compound is used as the positive electrode active material. The positive electrode active material may be a mixed metal oxide such as $LiCoO_2$, $LiMn_2O_4$, $LiNiO_2$, $LiNi_{1-x}Co_xO_2 (0<x<1)$, or $LiMnO_2$. As for the negative electrode active material, a carbon (C) series material (e.g. Si, Sn, a tin oxide, a composite tin alloy, a transition metal oxide, a Li metal nitride, or a Li metal oxide) is used. In the first electrode plate 111 and the second electrode plate 112, an electrode plate used as a positive electrode plate, for example, the first electrode plate 111, is made of an Al material. An electrode plate used as a negative electrode plate, for example, the second electrode plate 112, is made of a copper (Cu) material. The separator 113 is made of polyethylene (PE) or polypropylene (PP). However, an aspect of the present invention is not limited to the above materials.

In order to prevent an electrical short between the first electrode plate 111 and the second electrode plate 112, an insulating tape (not shown) respectively insulates a boundary portion from which the first electrode tab 111a and the second electrode tab 112a protrude.

The secondary battery case 120 is substantially a cylindrical metal case having an open upper portion. In the secondary battery case 120, a cylindrical surface 121 has a specific space with a specific diameter, a bottom surface 122 is formed at a lower portion of the cylindrical surface 121 to block a lower space of the cylindrical surface 121, and an upper portion of the cylindrical surface 121 is open so as to insert the electrode assembly 110. Any one of the first electrode tab 111a of the electrode assembly 110 and the second electrode tab 112a thereof, for example, the second electrode tab 112a, is bonded at the center of the bottom surface 122 of the secondary battery case 120, and thus the secondary battery case 120 itself functions as the electrode with the second electrode plate 112, for example, a negative electrode terminal. The secondary battery case 120 is generally made of aluminum (Al), steel (Fe), or an alloy of Al and Fe. Further, in the upper portion of the secondary battery case 120, a crimping portion 123 is curved in one direction so as to press the cap assembly 130, and a beading portion 124 is concaved inwards to press the cap assembly 130 from bottom to top.

The cap assembly 130 includes: a conductive safety belt 131 which is welded to the first electrode tab 111a and is inverted in the case of over-charging or abnormal heating; a printed circuit board (PCB) 132 which is electrically and mechanically connected to an upper portion of the safety belt 131 and cuts a circuit when the safety belt 131 is inverted; a positive temperature coefficient element 133 which is electrically and mechanically connected to an upper portion of the PCB 132 and cuts a circuit at a specific temperature or higher; a conductive electrode cap 134 which is electrically and mechanically connected to an upper portion of the positive temperature coefficient (PTC) element 133 and applies a practical current to an external circuit; and a gasket 135 which encloses lateral circumferences of the safety belt 131, the PCB 132, the positive temperature element 133, and the electrode cap 134, to isolate them from the secondary battery case 120. Here, the electrode cap 134 may be bonded to any one of the first electrode tab 111a of the electrode assembly 110 and the second electrode tab 112a thereof. For example, if the electrode cap 134 is bonded to the first electrode tab 111a, the first electrode tab 111a may function as the electrode with the first electrode plate 111, in this case, as a positive electrode terminal.

The electrolytic solution 140 functions as a medium for moving Li-ion generated by an electrochemical reaction that occurs in positive and negative electrodes at charging/discharging times. The electrolytic solution 140 may be a non-aqueous type organic electrolytic solution which is a mixture of a lithium salt and an organic solvent type with high purity. Further, the electrolytic solution 140 may be a polymer using a polymer electrolyte, but the type of the electrolytic solution material is not limited thereto.

When the internal temperature of the cylindrical Li secondary battery 100 rises to a predetermined temperature or higher, preferably about 80° C. or higher, at which the cylindrical Li secondary battery 100 may be in an abnormal condition, the ignition inhibitor 150 prevents the internal temperature of the cylindrical Li secondary battery 100 from further rising, thereby preventing a dangerous situation, for example, an explosion of the cylindrical Li secondary battery 100. That is, by preventing the internal temperature of the cylindrical Li secondary battery 100 from rising to the predetermined temperature of 80° C. or higher, the ignition inhibitor 150 can restrict ignition of the cylindrical Li secondary battery 100.

The ignition inhibitor 150 may be formed on at least a portion of the inner surface of the secondary battery case 120 having the shape of a cylindrical can. In this case, the ignition inhibitor 150 is not formed in a portion where the second electrode tab 112a of the electrode assembly 110 is attached to the secondary battery case 120.

The ignition inhibitor 150 may include: an ignition inhibiting material layer 151 which is formed on at least a portion of the inner surface of the secondary battery case 120 and includes an ignition inhibiting material; and a separation film 152 which separates the ignition inhibiting material layer 151 from the electrolyte solution 140.

The ignition inhibiting material layer 151 may be made of an ignition inhibiting material which can be inserted and diffused inside the cylindrical Li secondary battery 100 so as to prevent further temperature rising after the internal temperature of the cylindrical Li secondary battery 100 reaches the predetermined temperature or higher, for example, 80° C. or higher. Preferably, the ignition inhibiting material layer 151 may be made of NaCl.

As described above, the separation film 152 separates the ignition inhibiting material layer 151 from the electrolyte solution 140. It is preferable that some or entire portions of the separation film 152 melt at the predetermined temperature of 80° C. or higher. By doing so, the ignition inhibiting material can be inserted into the cylindrical Li secondary battery 100. Preferably, the separation film 152 is made of a thermoplastic, such as, a paraffin series material which melts when heat is applied.

Now, the operation of the cylindrical Li secondary battery 100 will be described.

First, when $LiCoO_2$ is used as the positive electrode active material, the following reaction occurs in the positive electrode plate.

$$LiCoO_2 \Leftrightarrow Li_{1-x}CoO_2 + xLi^+ + xe^-$$

That is, in the positive electrode plate, the positive electrode active material $LiCoO_2$ is decomposed into positive ion (Li+) and electron (e−) at a charging time. On the other hand, at a discharging time, positive ion (Li+) and electron (e−) are bonded forming the positive electrode active material $LiCoO_2$.

When graphite (C) is used as the negative electrode active material, the following reaction occurs in the negative electrode plate.

$$C_n + xLi^+ + xe^- \Leftrightarrow C_nLi_x$$

That is, in the negative electrode plate, the negative electrode active material of graphite is bonded with positive ion (Li+) and electron (e−) to form $C_nLi_x$ at a charging time. On the other hand, at a discharging time, $C_nLi_x$ is decomposed, forming graphite (C), positive ion (Li+), and electron (e−)

The overall chemical reaction of the cylindrical Li secondary battery 100 at charging/discharging times can be expressed as follows.

$$LiCoO_2 + C_n \Leftrightarrow Li_{1-x}CoO_2 + C_nLi_x$$

The aforementioned electrochemical reaction of the cylindrical Li secondary battery 100 at charging/discharging times may generate heat inside the cylindrical Li secondary battery 100. As a result, the internal temperature of the cylindrical Li secondary battery 100 rises.

In particular, if the cylindrical Li secondary battery 100 is over-charged, an excessive amount of Li is extracted in the positive electrode and inserted in the negative electrode. Thus, both positive and negative electrodes become thermally unstable, which causes not only an abrupt exothermic reaction, for example, an organic solvent of the electrolyte solution 140 is decomposed, but also a thermal runaway phenomenon. Accordingly, the internal temperature of the cylindrical Li secondary battery 100 abruptly rises.

In this case, if the internal temperature of the cylindrical Li secondary battery 100 rises to the predetermined temperature of 80° C. or higher, the separation film 152 of the ignition inhibitor 150 melts so that at least a portion of the separation film 152 is open. As a result, the ignition inhibiting material of the ignition inhibiting material layer 151 is inserted and diffused inside the cylindrical Li secondary battery 100, thereby restricting the rising of the internal temperature of the cylindrical Li secondary battery 100. Accordingly, dangers such as an explosion of the cylindrical Li secondary battery 100, due to the internal temperature rising, can be avoided.

Figure 2A:
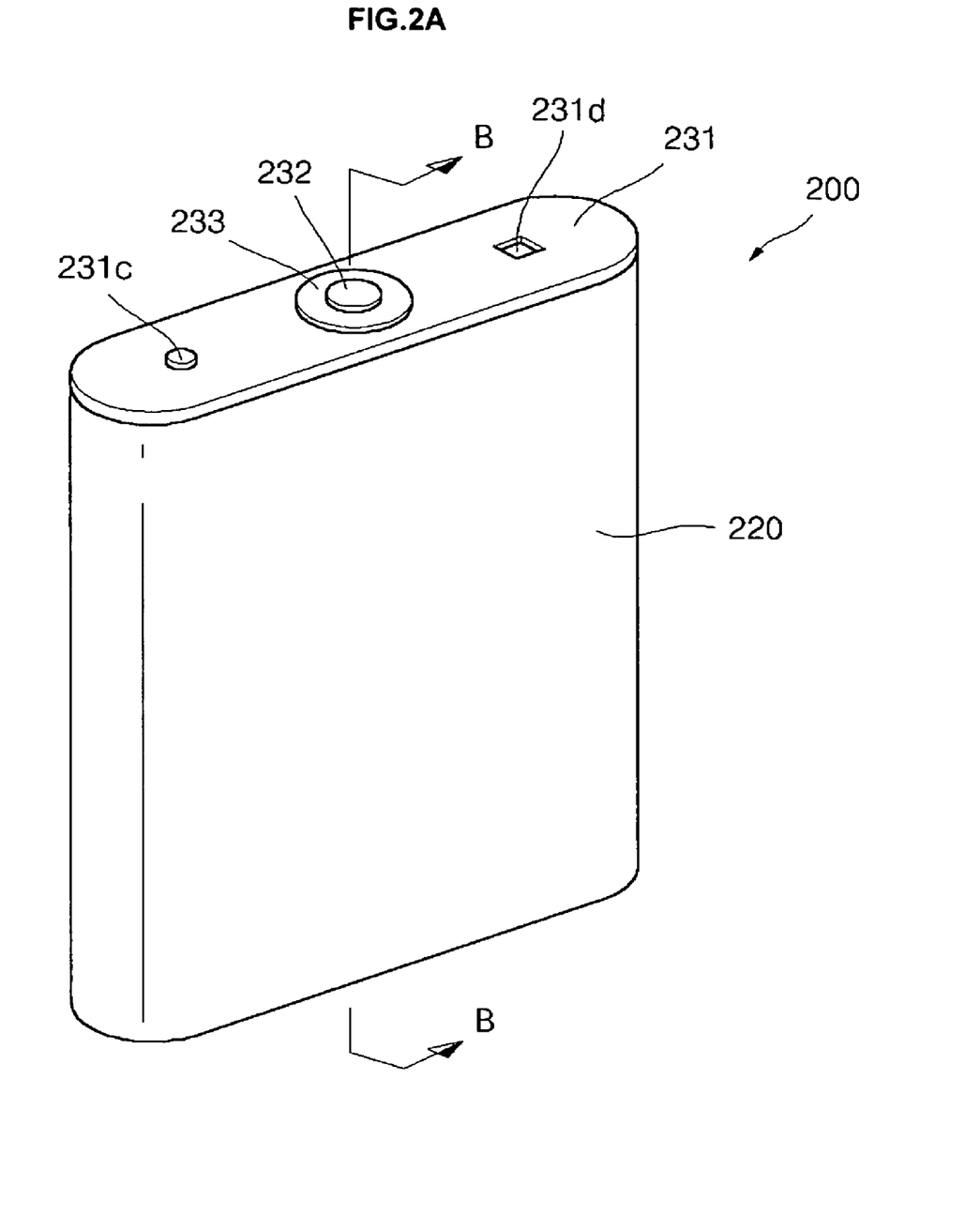
FIG. 2A is a perspective view of a prismatic Li secondary battery according to an embodiment of the present invention.
Figure 2B:
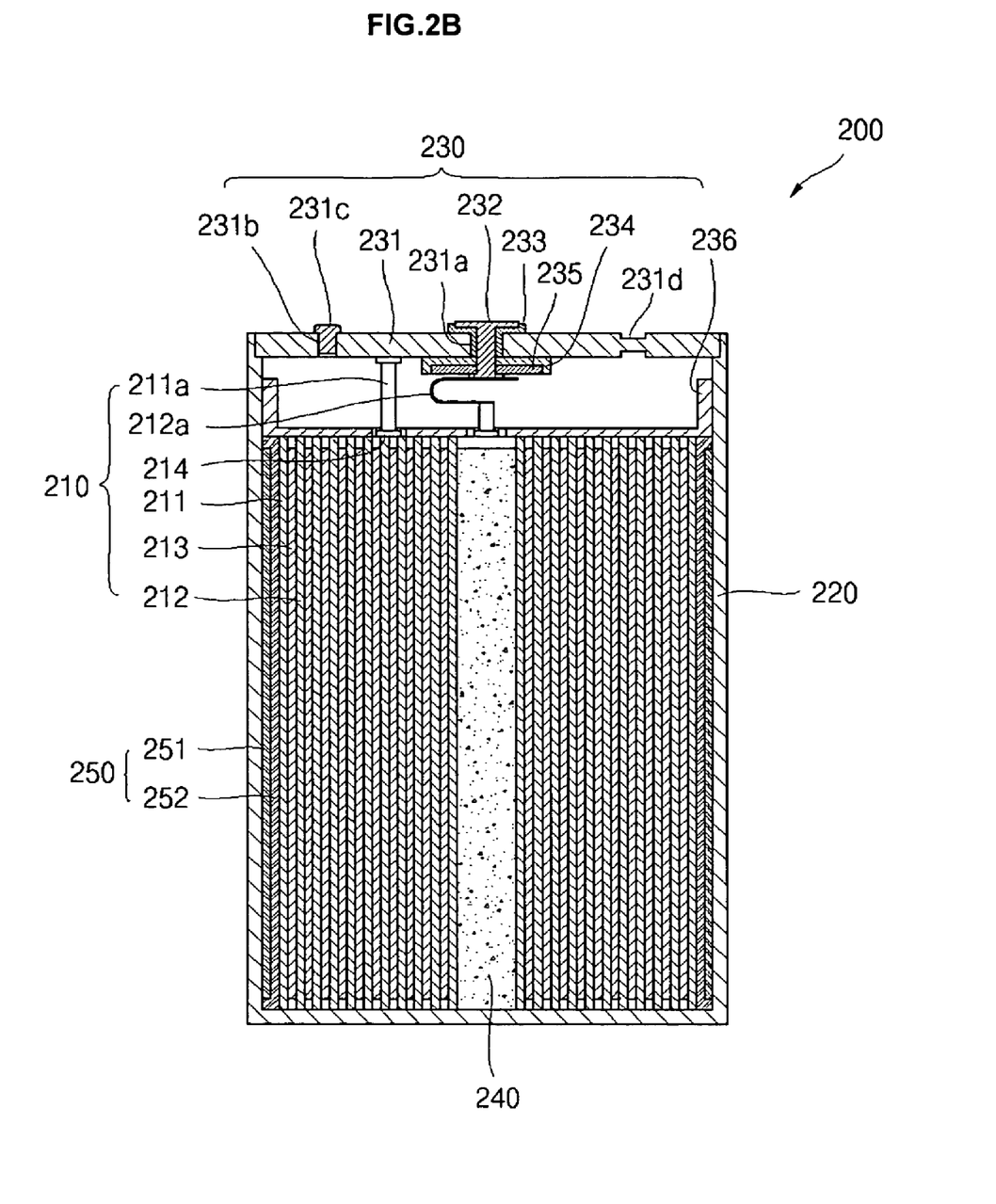
FIG. 2B is a cross-sectional view of the prismatic Li secondary battery of FIG. 2, viewed along the B-B line.

FIG. 2A is a perspective view of a prismatic Li secondary battery according to an embodiment of the present invention. FIG. 2B is a cross-sectional view of the prismatic Li secondary battery of FIG. 2A, viewed along the B-B line.

Referring to FIGS. 2A and 2B, a prismatic Li secondary battery 200 includes: an electrode assembly 210 which generates a voltage difference at charging/discharging times; a secondary battery case 220 which accommodates the electrode assembly 210; a cap assembly 230 which is assembled at an upper portion of the secondary battery case 220; an electrolyte solution 240 which is injected into the secondary battery case 220 to allow Li-ion to move in the electrode assembly 210; and a ignition inhibitor 250 which prevents an internal temperature of the prismatic Li secondary battery 200 from rising due to an abnormal heat generation.

The electrode assembly 210 includes: a first electrode plate 211 attached with a first electrode tab 211a; a second electrode plate 212 attached with a second electrode tab 212a; and a separator 213 interposed between the first electrode plate 211 and the second electrode plate 212. The first electrode plate 211, the second electrode plate 212, and the separator 213 are rolled and accommodated in the secondary battery case 220. In order to prevent an electrical short between the first electrode plate 211 and the second electrode plate 212, an insulating tape 214 respectively insulates a boundary portion from which the first electrode tab 211a and the second electrode tab 212a protrude.

The secondary battery case 220 is composed of a metal can in the shape of a box having an open upper portion. The secondary battery case 220 itself may function as electrode terminals. In general, the secondary battery case 220 is electrically connected with the first electrode tab 211a so as to function as the electrode with the first electrode plate 211, for example, a positive electrode terminal.

The cap assembly 230 is provided with a flat cap plate 231 having a size and shape corresponding to an opening portion of the secondary battery case 220. An electrode through-hole 231a is formed at the center of the flat cap plate 231. An electrolyte solution inserting hole 231b is formed at a first side of the flat cap plate 231 for inserting an electrolyte solution. The electrolyte solution inserting hole 231b is bond sealed by ball 231c. A safety vent 231d is formed at a second side of the flat cap plate 231 to avoid explosion of the prismatic Li secondary battery 200 when the internal pressure of the prismatic Li secondary battery 200 rises.

An electrode terminal 232, for example, a negative electrode terminal, is disposed in the electrode through-hole 231a in an insertion manner. A tube shaped gasket 233 is formed on an outer surface of the electrode terminal 232 so as to be elastically insulated from the flat cap plate 231.

An insulating plate 234 is disposed at a lower portion of the flat cap plate 231. The insulating plate 234 is attached to the bottom surface of the flat cap plate 231, and has a through-hole corresponding to the electrode through-hole 231a. A terminal plate 235 having a through-hole corresponding to the electrode through-hole 231a is disposed at the bottom surface of the insulating plate 234. A lower portion of the electrode terminal 232 is electrically connected with the terminal plate 235 where the insulating plate 234 is disposed.

The first electrode tab 211a protruding from the first electrode plate 211 is welded in the bottom surface of the flat cap plate 231. The second electrode tab 212a protruding from the second electrode plate 212 is welded in the lower portion of the electrode terminal 232.

An insulating case 236 is disposed on the top surface of the electrode assembly 210. The insulating case 236 electrically connects the electrode assembly 210 with the cap assembly 230, and covers an upper portion of the electrode assembly 210. The insulating case 236 includes an electrolyte solution inserting through-hole at a position corresponding to the electrolyte solution inserting hole 231b of the flat cap plate 231 so as to insert the electrolyte solution therethrough. The insulating case 236 is a polymer resin having an insulation property, preferably, polypropylene. However, an aspect of the present invention is not limited to the above material.

The ignition inhibitor 250 is formed at least at a portion of the inner surface of the secondary battery case 220 composed of a metal can in the shape of a substantial box having an open upper portion. The ignition inhibitor 250 may include: an ignition inhibiting material layer 251 which is formed on at least a portion of the inner surface of the prismatic Li secondary battery 200 and is made of an ignition inhibiting material; and a separation film 252 which separates the ignition inhibiting material layer 251 from the electrolyte solution 240.

When an internal temperature of the prismatic Li secondary battery 200 rises to a predetermined temperature or higher, preferably about 80° C. or higher, at which the prismatic Li secondary battery 200 may be in an abnormal condition, the ignition inhibitor 250 prevents the internal temperature of the prismatic Li secondary battery 200 from further rising, thereby preventing a dangerous situation, for example, explosion of the prismatic Li secondary battery 200. That is, the ignition inhibitor 250 can restrict ignition of the prismatic Li secondary battery 200.

Figure 3A:
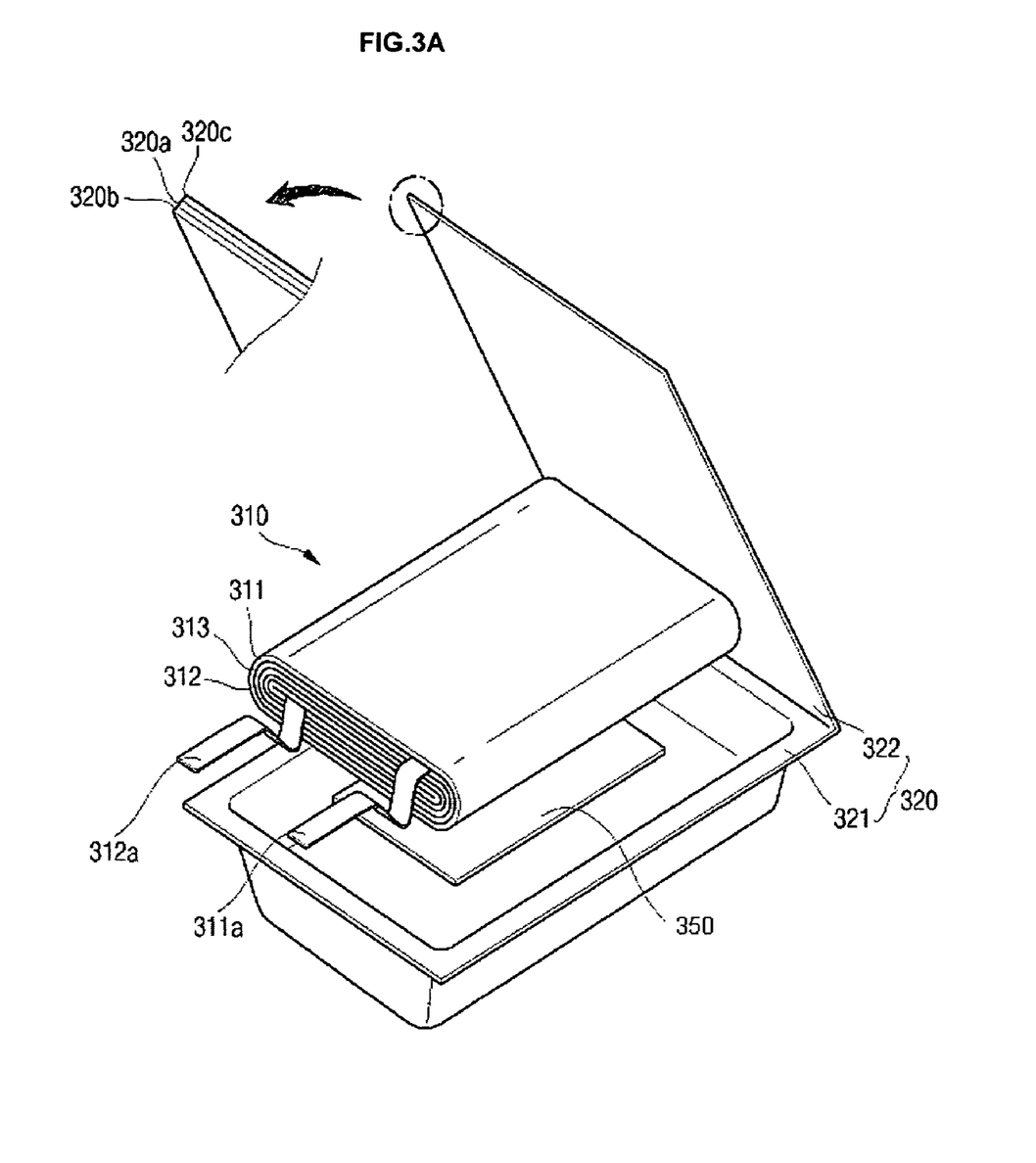
FIG. 3A is an exploded perspective view of a pouch-type Li secondary battery according to an embodiment of the present invention.
Figure 3B:
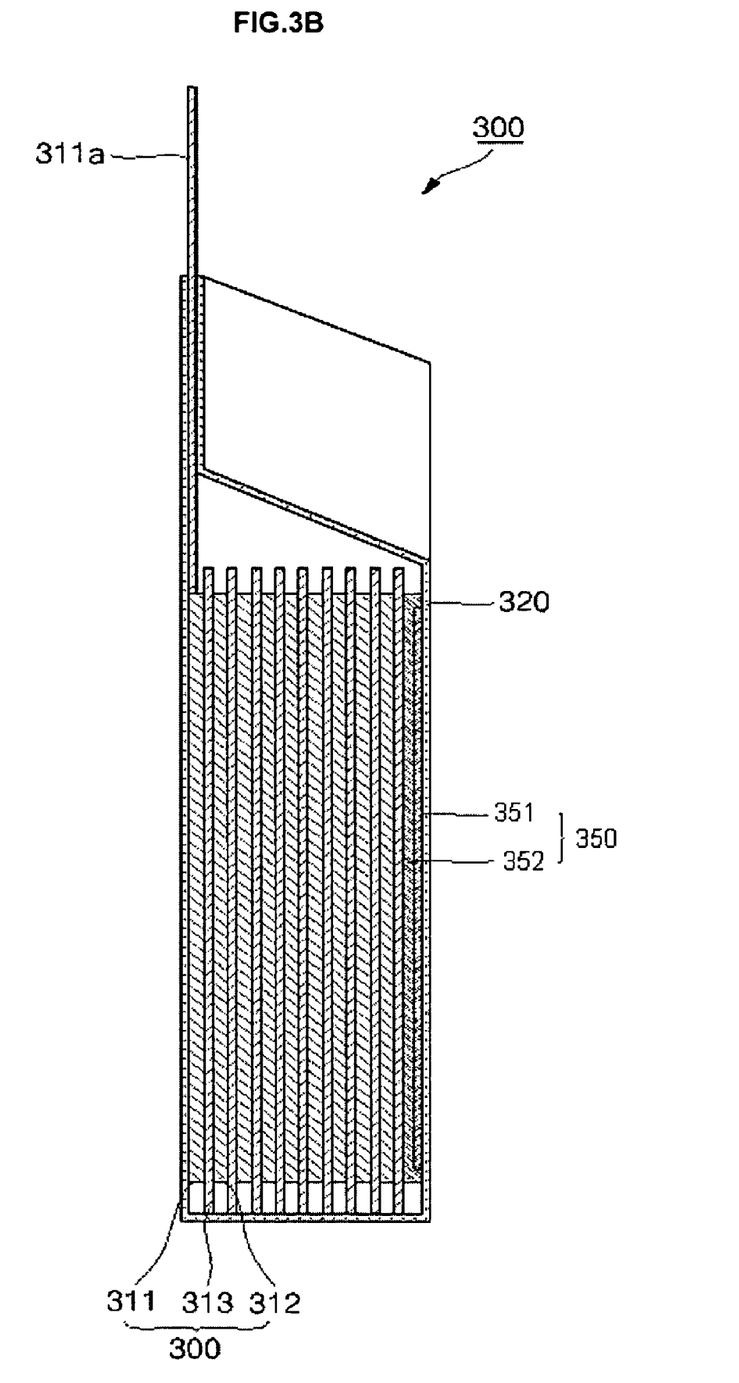
FIG. 3B is a cross-sectional view of the pouch-type Li secondary battery of FIG. 3A.

FIG. 3A is an exploded perspective view of a pouch-type Li secondary battery according to an embodiment of the present invention. FIG. 3B is a cross-sectional view of the pouch-type Li secondary battery of FIG. 3A.

Referring to FIGS. 3A and 3B, a pouch-type Li secondary battery 300 includes: an electrode assembly 310 which generates a voltage difference at charging/discharging times; a secondary battery case 320 which accommodates the electrode assembly 310; and an ignition inhibitor 350 which prevents an internal temperature of the pouch-type Li secondary battery 300 from rising due to an abnormal heat generation.

The electrode assembly 310 includes: a first electrode plate 311 attached to a first electrode tab 311a; a second electrode plate 312 attached to a second electrode tab 312a; and a separator 313 interposed between the first electrode plate 311 and the second electrode plate 312. The first electrode plate 311, the second electrode plate 312, and the separator 313 are rolled and accommodated in the secondary battery case 320.

Although not shown, in order to prevent an electrical short between the first electrode plate 311 and the second electrode plate 312, an insulating tape may respectively insulate a boundary portion from which the first electrode tab 311a and the second electrode tab 312a protrude.

The secondary battery case 320 is a pouch-type case. The pouch-type secondary battery case 320 includes: a core 320a made of a metal material such as aluminum (Al); a thermal bonding layer 320b formed on the upper surface of the core 320a; and an insulating layer 320c formed on the lower surface of the core 320a. The thermal bonding layer 320b functions as an adhesive layer by using a polymer resin of a modified polypropylene, for example, casted polypropylene. The insulating layer 320c may be made of a resin material such as nylon or polyethylene-terephthalate (PET). However, the secondary battery case 320 is not limited to the above structure and material.

The secondary battery case 320 includes: a lower portion 321 which has a space for accommodating the electrode assembly 310; and an upper portion 322 which covers the lower portion 321. The space for accommodating the electrode assembly 310 is formed by a press operation. When the secondary battery case 320 is constructed, the electrode assembly 310 is accommodated in the space of the lower portion 321, and the upper portion 322 is covered and sealed.

The ignition inhibitor 350 is formed on at least a portion of the inner surface of the secondary battery case 320 that is the pouch-type case. The ignition inhibitor 350 may include: an ignition inhibiting material layer 351 which is formed on at least a portion of the inner surface of the secondary battery case 320 and is made of an ignition inhibiting material; and a separation film 352 which separates the ignition inhibiting material layer 351 from an electrolyte solution.

If a melting temperature of the thermal bonding layer 320b is controlled, such as when the core 320a is made of a metal layer and an ignition inhibiting material layer, and the ignition inhibiting material layer is covered with the thermal bonding layer 320b, then the pouch-type case itself can be used as an ignition inhibitor without having to additionally use the ignition inhibitor 350 of the present embodiment.

When the internal temperature of the pouch-type Li secondary battery 300 rises to a predetermined temperature or higher, preferably about 80° C. or higher, at which the pouch-type Li secondary battery 300 may be in an abnormal condition, the ignition inhibitor 350 prevents the internal temperature of the pouch-type Li secondary battery 300 from further rising, thereby preventing a dangerous situation, for example, explosion of the pouch-type Li secondary battery 300. That is, the ignition inhibitor 350 can restrict ignition of the pouch-type Li secondary battery 300.

As described above, the Li secondary batteries 100, 200, and 300 according to embodiments of the present invention include the ignition inhibitor 350 so as to prevent abnormality and explosion of the batteries when their internal temperatures rise. Specifically, the Li secondary batteries 100, 200, and 300 are formed on at least a portion of the inner surfaces of the secondary battery cases 120, 220, and 320, and include the ignition inhibitors 150, 250, and 350 having the ignition inhibiting material layers 151, 251, and 351 that are separated from the electrolyte solutions by the separation films 152, 252, and 352. By doing so, when the internal temperatures of the batteries rise to a predetermined temperature or higher, at least a portion of the separation films 152, 252, and 352 is open, and the ignition inhibiting materials are inserted and diffused inside the batteries, thereby restricting further rising of the internal temperatures of the batteries. Therefore, temperatures of the Li secondary batteries 100, 200, and 300 become more stable.

Accordingly, an aspect of the present invention provides a thermally stabilized Li secondary battery in which at least a portion of the inner surface of a secondary battery case includes an ignition inhibitor so as to prevent an internal temperature of the secondary battery from rising to a predetermined temperature or higher.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A lithium secondary battery comprising:
   an electrode assembly which includes a first electrode plate, a second electrode plate, and a separator interposed between the first electrode plate and the second electrode plate, the electrode assembly having an outer side surface;
   a secondary battery case having an inner side surface that defines an internal space for accommodating the electrode assembly;
   an electrolyte contained in the secondary battery case; and
   an ignition inhibitor disposed between at least a portion of the inner side surface of the secondary battery case and at least a portion of the outer side surface of the electrode assembly,
   wherein the ignition inhibitor comprises:
      an ignition inhibiting material layer coated on at least part of the inner side surface, the ignition inhibiting material layer comprising an ignition inhibiting material, wherein the ignition inhibiting material is configured to, upon contacting the electrolyte, restrict further rising of internal temperature of the battery; and
      a separation film contacting the electrolyte and separating the ignition inhibiting material layer from the electrolyte, wherein the separation film comprises a paraffin and is configured to melt at a temperature so as to let at least a portion of the ignition inhibiting material diffuse inward of the separation film and contact the electrolyte.

2. The lithium secondary battery of claim 1, wherein the ignition inhibiting material layer comprises NaCl.

3. The lithium secondary battery of claim 1, wherein the temperature is 80° C. or higher.

4. The secondary battery of claim 1, wherein the secondary battery case is a cylindrical metal case having an open upper portion, a box-type metal can having an open upper portion, or a pouch-type case.

5. The secondary battery of claim 4, further comprising a cap assembly which is bonded with an upper portion of the secondary battery case so as to seal the upper portion of the secondary battery, if the secondary battery case is the cylindrical metal case or the box-type metal case having the open upper portion.

6. The secondary battery of claim 4, wherein the pouch-type case includes:
   a core comprising a metal layer and the ignition inhibiting material layer; and
   a heat sealable resin layer that is laminated on the ignition inhibiting material layer.

7. A secondary battery comprising:
   an electrode assembly configured to generate a voltage difference at charging/discharging times;
   a secondary battery case having side and upper portions that define a space, which accommodates the electrode assembly;
   a cap assembly disposed at the upper portion of the secondary battery case;
   an electrolyte contained within the secondary battery case; and
   an ignition inhibitor disposed between the side portion of the secondary battery case and the electrolyte and configured to prevent an internal temperature of the secondary battery from rising abnormally,
   wherein the ignition inhibitor includes:
      an ignition inhibiting material layer coated on at least part of the side portion of the secondary battery case, the ignition inhibiting material layer comprising an ignition inhibiting material, wherein the ignition inhibiting material is configured to, upon contacting the electrolyte, restrict further rising of internal temperature of the battery;
      a separation film contacting the electrolyte and separating the ignition inhibiting material layer from the electrolyte, wherein the separation film includes a paraffin series material and is configured to melt at a temperature so as to let at least a portion of the ignition inhibiting material diffuse inward of the separation film and contact the electrolyte.

8. The secondary battery of claim 7, wherein the ignition inhibiting material layer includes NaCl.

9. The secondary battery of claim 7, wherein in the upper portion of the secondary battery case, a crimping portion is curved in one direction so as to press the cap assembly, and a beading portion is concaved inwards to press the cap assembly from bottom to top.

* * * * *